United States Patent
Ikeda et al.

(10) Patent No.: US 7,538,904 B2
(45) Date of Patent: May 26, 2009

(54) SYSTEM FOR ADMINISTERING READOUT CONTENTS, IMAGE READER DEVICE, AND METHOD FOR ADMINISTERING CONTENTS

(75) Inventors: Sotomitsu Ikeda, Kanagawa (JP); Makoto Satoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1152 days.

(21) Appl. No.: 10/803,926

(22) Filed: Mar. 19, 2004

(65) Prior Publication Data
US 2004/0194133 A1 Sep. 30, 2004

(30) Foreign Application Priority Data
Mar. 28, 2003 (JP) ............... 2003-092091
Feb. 27, 2004 (JP) ............... 2004-053626

(51) Int. Cl.
*H04N 1/40* (2006.01)
*H04N 1/387* (2006.01)
*G06K 15/00* (2006.01)

(52) U.S. Cl. .................. 358/1.18; 358/462; 358/453

(58) Field of Classification Search ............. 358/453, 358/443, 440, 470, 3.28, 474, 475, 462, 1.18, 358/1.6, 1.9, 1.11
See application file for complete search history.

(56) References Cited

U.S. PATENT DOCUMENTS

| | | | | |
|---|---|---|---|---|
| 5,138,465 | A * | 8/1992 | Ng et al. ............... | 358/453 |
| 6,750,942 | B2 * | 6/2004 | Honda ................. | 352/92 |
| 6,970,259 | B1 * | 11/2005 | Lunt et al. ............. | 358/1.14 |
| 2002/0016739 | A1 | 2/2002 | Ogasawara ............ | 705/22 |
| 2002/0088856 | A1 | 7/2002 | Swartz ................. | 235/385 |
| 2002/0106192 | A1 * | 8/2002 | Sako ................... | 386/94 |
| 2003/0014483 | A1 * | 1/2003 | Stevenson et al. ....... | 709/203 |
| 2003/0061200 | A1 | 3/2003 | Hubert et al. .......... | 707/3 |
| 2004/0008838 | A1 * | 1/2004 | Kobayashi et al. ...... | 379/354 |
| 2004/0193742 | A1 * | 9/2004 | Ikeda .................. | 710/1 |
| 2005/0210531 | A1 * | 9/2005 | Bertin ................. | 725/143 |
| 2006/0015815 | A1 * | 1/2006 | Okamoto .............. | 715/736 |
| 2006/0080735 | A1 * | 4/2006 | Brinson et al. ......... | 726/22 |

(Continued)

FOREIGN PATENT DOCUMENTS

DE 197 20 747 A1 11/1997

(Continued)

OTHER PUBLICATIONS

European Communication Pursuant to Article 94(3) EPC dated Feb. 2, 2009, Regarding Application No. 04 251 730.0 - 2210.

(Continued)

*Primary Examiner*—Jerome Grant, II
(74) *Attorney, Agent, or Firm*—Fitzpatrick, Cella, Harper & Scinto

(57) ABSTRACT

A system for administering readout contents according to the present invention includes: an image reader device having an image read unit for reading out contents information drawn on display media with an RF-ID tag and an RF-ID read unit for reading out identification information on the RF-ID tag of the display media by wireless communication; and a data administration device for accumulating the contents information read out by the image read unit and administration information related to the contents information, in association with identification information.

5 Claims, 9 Drawing Sheets

U.S. PATENT DOCUMENTS

| | | | |
|---|---|---|---|
| 2006/0187482 A1* | 8/2006 | Ochiai et al. | 358/1.15 |
| 2007/0012769 A1* | 1/2007 | Tanaka | 235/432 |
| 2008/0059473 A1* | 3/2008 | Yamaguchi et al. | 707/9 |

FOREIGN PATENT DOCUMENTS

| | | |
|---|---|---|
| EP | 0 980 178 A2 | 2/2000 |
| EP | 1 049 317 A2 | 11/2000 |
| EP | 1 049 317 A3 | 11/2000 |
| JP | 4-302374 | 10/1992 |
| JP | 11-78176 | 3/1999 |
| JP | 2000-148790 | 5/2000 |
| JP | 2000-285203 | 10/2000 |
| JP | 2002-120475 | 4/2002 |
| JP | 2002-182956 | 6/2002 |
| JP | 2002-269271 | 9/2002 |
| JP | 2002-297607 | 10/2002 |
| JP | 2002-334088 | 11/2002 |
| JP | 2003-67363 | 3/2003 |
| JP | 2005258814 * | 9/2005 |
| WO | WO 03/077196 A1 | 9/2003 |

OTHER PUBLICATIONS

Japanese Notice of Reasons for Rejection dated Jan. 13, 2009, regarding Japanese Patent Application No. 2004-053626 (English translation).

* cited by examiner

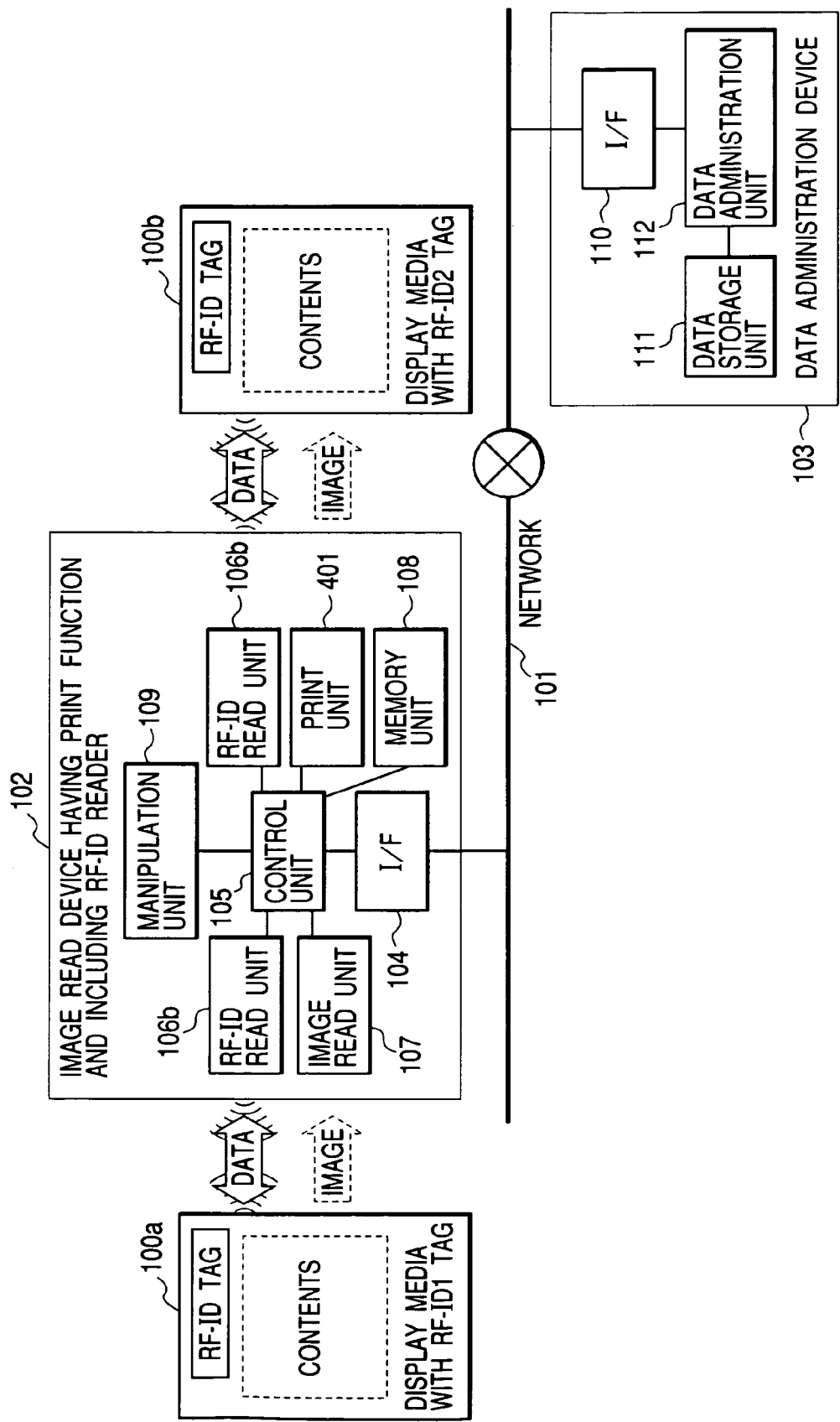

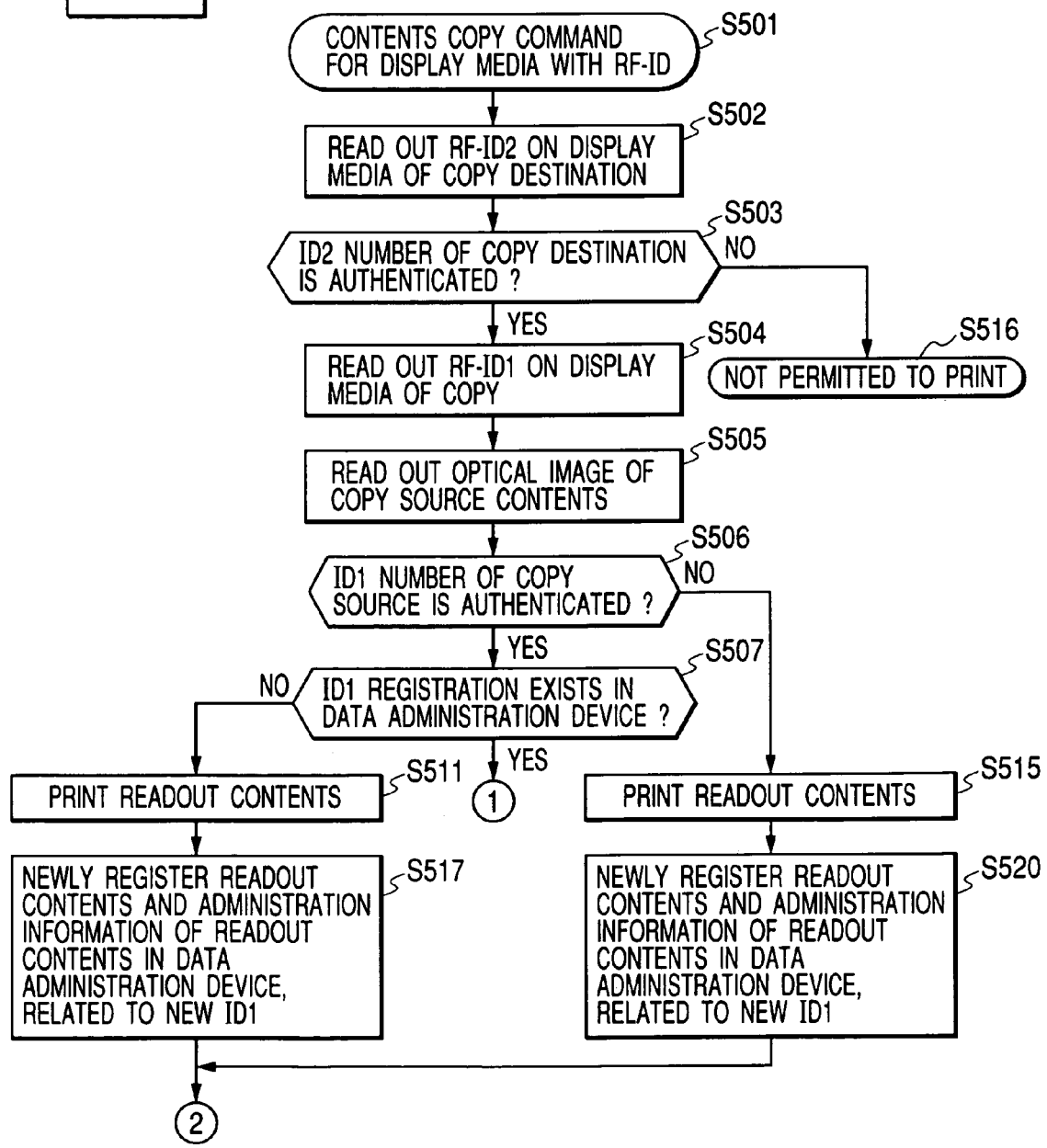

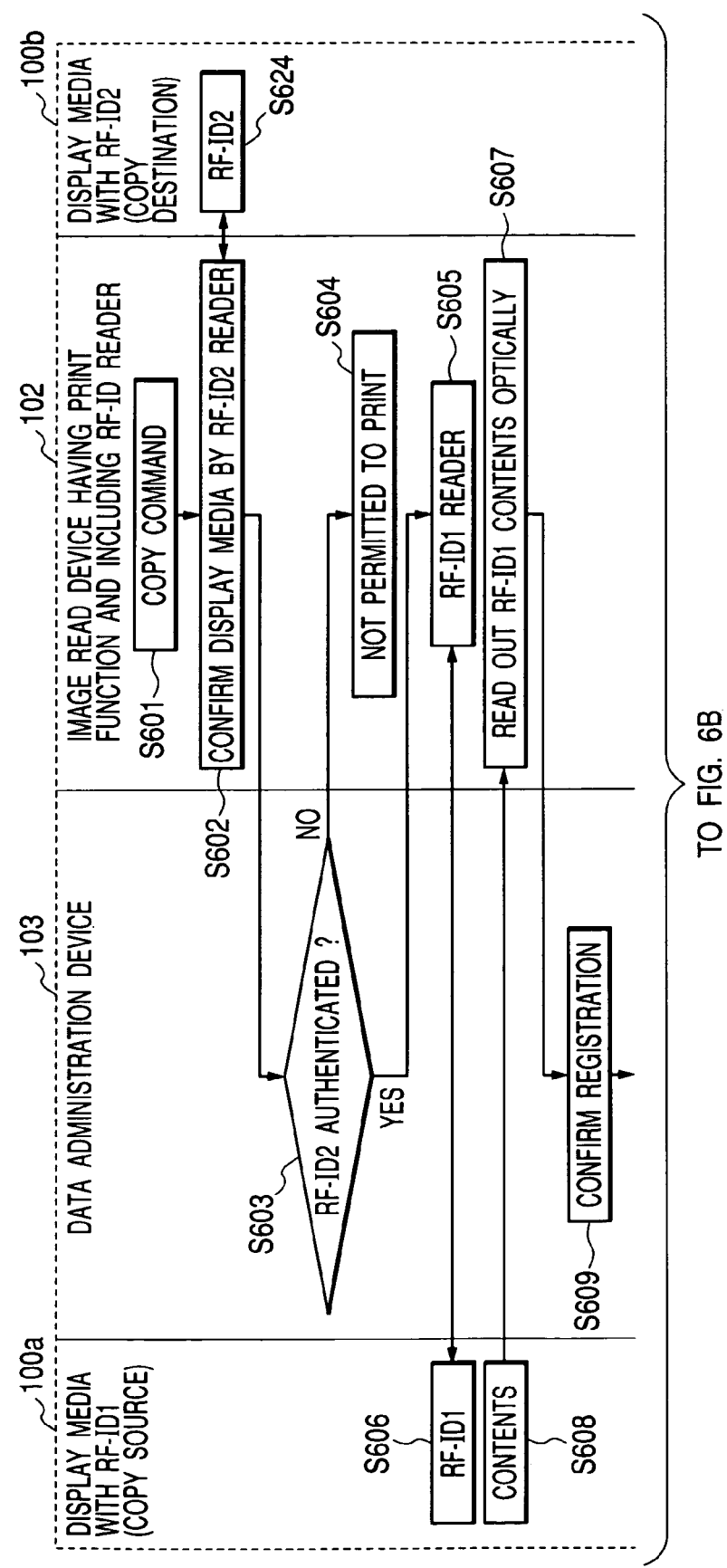

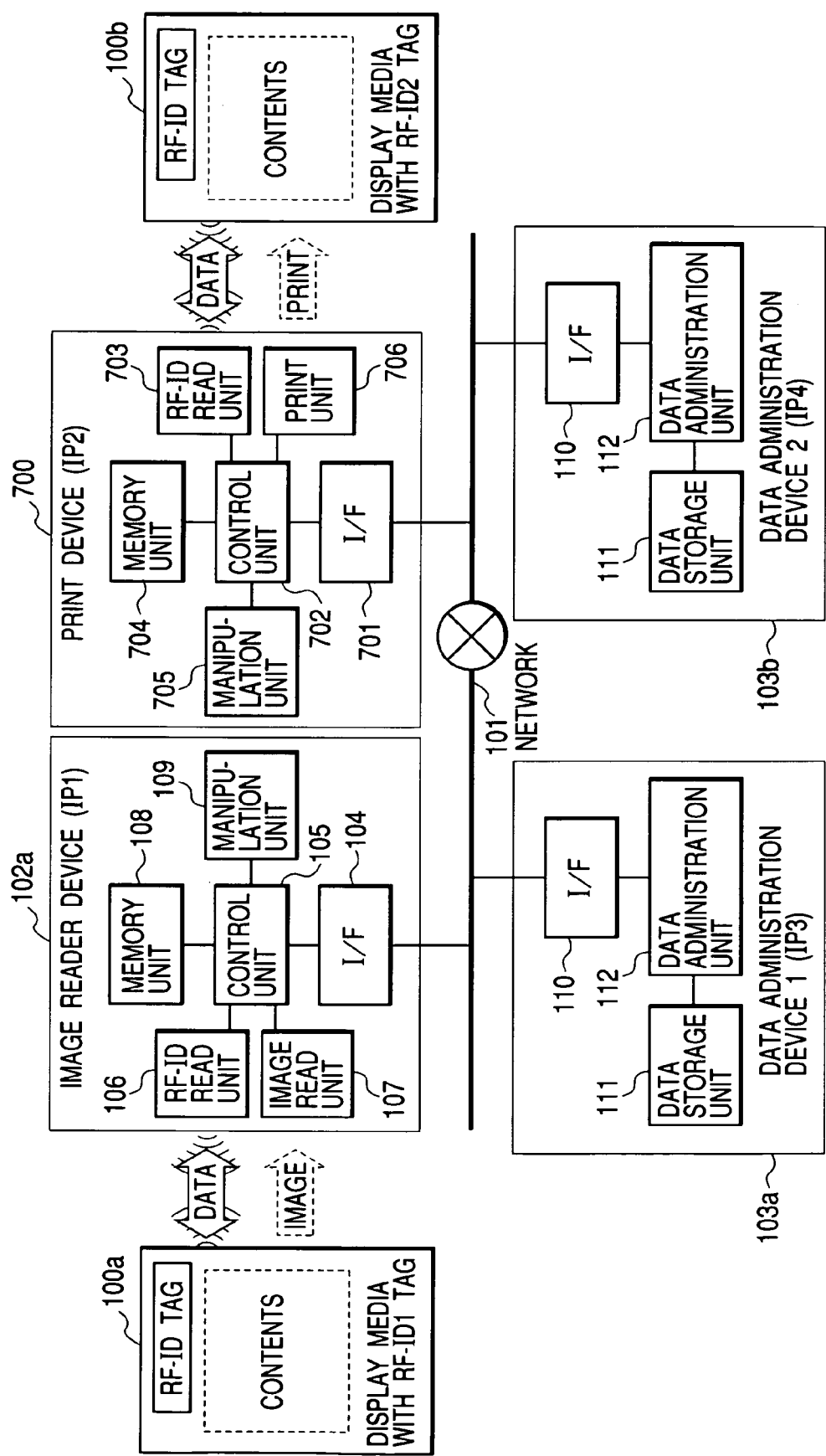

SYSTEM FOR ADMINISTERING READOUT CONTENTS, IMAGE READER DEVICE, AND METHOD FOR ADMINISTERING CONTENTS

BACKGROUND OF THE INVENTION

1. Field of the Invention

The present invention relates to a system for administering readout contents, an image reader device, and a method for administering contents.

2. Related Background Art

In a conventional system mainly based on electronic information and paper information, for example, electronic information generated by a personal computer or the like is printed by a printing device such as a printer and an LBP to be formed into paper information, and the paper information is formed into electronic information by an optical image reader device or the like. The electronic information and the paper information are chosen according to the use environment, and coexist independently.

Regarding the electronization of paper information, Japanese Patent Application Laid-Open No. 2000-285203 discloses a technique of using paper containing an IC chip for a method for transmitting information. According to this technique, information printed on paper is also accumulated in an IC chip attached to the paper, and in the case of printing the same information on another paper, the information accumulated in the IC chip is read out and printed. Thus, using paper as electronic storage media, information is distributed, transmitted/received, and stored.

Furthermore, as a printed output issuance administration system, Japanese Patent Application Laid-Open No. H11-78176 discloses a technique relating to a system for preventing unauthorized issuance of printed output. This system is used, for example, for administering the issuance of printed output such as negotiable securities and works. According to this technique, in display media having identification information, contents stored in a contents administration device are printed on the display media only in the case where the identification information is recognized as being valid. Thus, printed output having valid identification information can be administered. In this publication, as the "identification information", for example, printed information such as characters and symbols, optical detection information such as magnetic information and a bar code, watermark, and the like are disclosed.

Conventional general paper information is separated from a network system at the instant when it is printed or copied and the information is read out. Thus, it is practically impossible to administer the paper information.

Japanese Patent Application Laid-Open No. 2000-285203 discloses a technique of storing contents in an IC chip. For the reasons described below, network administration of contents seems to become mainstream.

(1) From now on, there is a possibility that a memory amount per chip will decrease as the IC chip size is reduced for realizing a decrease in cost of an IC chip, and hence, contents that can be accumulated will become limited.

(2) Due to the increased speed and increased transmission capacity of a network, contents administered on a network can be accessed at any time from any place.

(3) It is desired that the access to the contents be administered with security. Furthermore, it is desired that permission of printing or the like be administered.

Thus, the scope of applications of paper having an IC-chip containing contents is limited.

The above-mentioned system disclosed in Japanese Patent Application Laid-Open No. H11-78176 is composed of a media information administration device, a contents administration device, a usage administration device, and a printer. In this system, three elements of contents, printing recording media, and a printing mechanism, required for issuing printed output, are administered independently in administering the issuance of printed output, whereby unauthorized issuance of printed output can be prevented, and important printed output such as negotiable securities, admission tickets, works, member cards, certificates, and the like can be printed remotely.

On the other hand, this system administers the issuance of printed output from the host side. Therefore, a user cannot register contents, change contents, or access contents administration information.

Furthermore, this system prints previously registered contents, and cannot newly administer contents that have already been printed.

SUMMARY OF THE INVENTION

The present invention has an object of solving the above-mentioned problems of the prior art.

Another object of the present invention is to realize easy access to contents information by a user and seamless use and administration of contents by the user.

Furthermore, still another object of the present invention is to provide a system suitable for electronization of contents information output to recording media, and an image reader device.

Other objects of the present invention will be apparent from the following description of the specification and the drawings.

According to the present invention, there is provided a system for administering contents, characterized by including: readout means for reading out contents information drawn on first display media; detection means for detecting identification information on the first display media; and administration means for administering the contents information read out by the read means and the identification information detected by the detection means in association with each other.

According to the present invention, there is provided an image reader device, characterized by including: read means for reading out contents information drawn on first display media; detection means for detecting identification information on the first display media; and transmission means for transmitting the contents information read out by the read means and the identification information detected by the detection means to a data administration device.

According to the present invention, there is provided a contents administration method, characterized by including: a reading step of reading contents information drawn on first display media; a detecting step of detecting identification information on the first display media; and an administering step of administering the contents information read out in the reading step and the identification information detected in the detecting step in association with each other.

According to the present invention, there is provided a contents administration method, characterized by including: a reading step of reading contents information drawn on first display media; a detecting step of detecting identification information on the first display media; and a transmitting step of transmitting the contents information read out in the reading step and the identification information detected in the detecting step to a data administration device.

BRIEF DESCRIPTION OF THE DRAWINGS

FIG. 4 is a block diagram showing a configuration of a contents sharing system using display media with an RF-ID tag according to a second embodiment of the present invention;

FIG. 7 is a block diagram showing a configuration of a contents sharing system using display media with an RF-ID tag according to a third embodiment of the present invention.

DETAILED DESCRIPTION OF THE PREFERRED EMBODIMENTS

Hereinafter, each embodiment of the present invention will be described with reference to the drawings.

First Embodiment

First, a first embodiment of the present invention will be described with reference to FIGS. 1 to 3.

Figure 1:
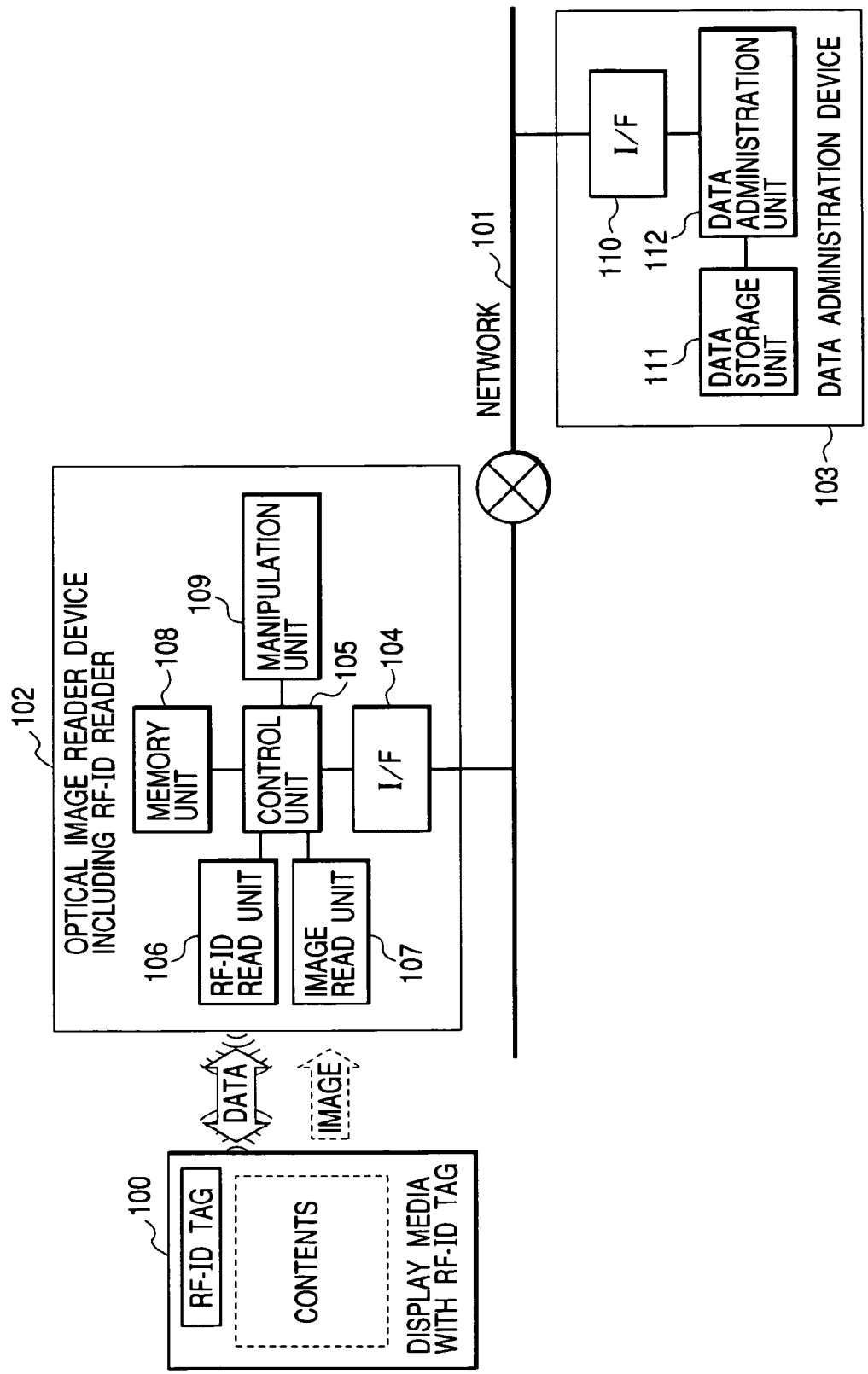
FIG. 1 is a block diagram showing a configuration of a contents sharing system using display media with an RF-ID tag according to a first embodiment of the present invention.

FIG. 1 is a block diagram showing a configuration of a contents sharing system using display media with an RF-ID tag according to the first embodiment of the present invention. In FIG. 1, reference numeral 100 denotes display media with an RF-ID tag, 101 denotes a network, 102 denotes an optical image reader device including an RF-ID reader, and 103 denotes a data administration device. The optical image reader device 102 including an RF-ID reader and the data administration device 103 are connected to the network 101 so as to be capable of performing communication with each other.

The optical image reader device 102 including an RF-ID reader includes a network/interface (I/F) 104, a control unit 105, an RF-ID read unit 106 that is an RF-ID reader, an image read unit 107, a memory unit 108, and a manipulation unit 109.

The display media with an RF-ID tag 100 and the optical image reader device 102 including an RF-ID reader performs wireless data communication between the RF-ID read unit 106 and the RF-ID tag, and read out RF-ID information electrically. In the image read unit 107, they read out image information optically from the contents on the display media with an RF-ID tag 100. Both the information are read out continuously or almost at the same time.

The display media with an RF-ID tag 100 refers to display media, in which identification information (e.g., ID No.) stored in an IC chip is provided via an RF-ID tag that can communicate with the RF-ID read unit 106 in a wireless manner. The RF-ID tag is fixed to the front or back surface of display media with an adhesive or the like, folded in display media, or interposed between two or more display media. Furthermore, the display media may be any media in a sheet shape on which printing can be performed, such as ordinary paper, coated paper, photographic paper such as a photograph, thermal recording paper, diazo sensitive paper, a PET film for an overhead projector, or a resin film made of polyethylene, plastic, etc.

The network interface 104 performs data communication via a communication line. An IP address is assigned in the optical image reader device 102 including an RF-ID reader, and the IP address is identified on the network 101.

The control unit 105 controls the read of an RF-ID tag, the read of contents, data communication, data display, data storage, and the like, and thus, controls the entire function of the high-speed optical image reader device 102 including an RF-ID reader.

The RF-ID read unit 106 electrically reads out an RF-ID tag attached to the display media with an RF-ID tag 100 in a wireless manner. The RF-ID read unit 106 is composed of a processor unit for performing control and data processing, an RF unit for modulating transmission data and encoding receiving data, and an antenna unit for performing RF communication with an RF-ID tag.

The image read unit 107 includes a light source, an image forming system, an image sensor, an A/D converter, a control LSI, and a DRAM, in the case of optical read. A drum scanner for capturing an image on a pixel basis in a time sequence, a flat bed scanner in which an original is placed downward on a transparent glass plate, a film scanner for a film captured by a camera, or the like is applicable to the image read unit 107.

The memory unit 108 is used for temporarily storing identification information, contents information regarding the identification information, administration information related to the contents information, and the like during processing and communication, thereby realizing high-speed printing and high degree of security.

The manipulation unit 109 is a human interface for instructing image read, and includes a display unit and an input unit. Specifically, the display unit may be a display capable of displaying at least information related to contents, or a display with a touch panel, in which a digitizer that can be used for input is formed on a surface. The display unit may display a processing state by lighting of a light-emitting diode (LED). Furthermore, the input unit may be an operation button, a voice input unit, or the like, instead of a touch panel. Furthermore, in the case where the RF-ID read unit 102 detects the supply of the display media with an RF-ID tag 100, image read may be instructed in accordance with the detected signal.

The optical image reader device 102 including an RF-ID reader may include a printing device, a data storage unit, and a data administration unit, in addition to the above-mentioned functions. Furthermore, the optical image reader device 102 including an RF-ID reader may be integrated with a computer. Furthermore, the optical image reader device 102 including an RF-ID reader may be an image reader device having a complex function of a copier, a printer, a scanner, a facsimile, a telephone, and the like.

The data administration device 103 includes a network/interface (I/F) 110, a data storage unit 111, and a data administration unit 112.

The network/interface 110 performs data communication via a communication line. The data administration device 103 is assigned an IP address, which is identified on the network 101.

The data storage unit 111 includes a database of identification information on an RF-ID tag that is permitted to be used, and a database including registered identification information, contents information related to the identification information, and administration information related to the contents information.

The database of ID information on an RF-ID tag that is permitted to be used is registered and updated at any time via the network 101, when the display media with an RF-ID tag 100 that can be used for the contents sharing system of the present invention is put on the market. This enables the display media with an RF-ID tag 100 that is guaranteed for security to be used, whereby printed output of contents can be administered with security.

The identification information after registration is an ID No. of an RF-ID tag registered when the contents drawn on the display media with an RF-ID tag 100 are read out as an image.

The contents information related to the identification information refers to the information obtained by reading out the contents drawn on the display media with an RF-ID tag 100 as an image. The contents information may refer to those which have already been accumulated so as to be associated with the identification information. More specifically, a plurality of pieces of contents information may be accumulated. The plurality of pieces of contents information can be accessed if required, and desired contents information can be printed, corrected, changed, and the like. Furthermore, in the case where the contents information is changed, the contents information before the change and the contents information after the change may be accumulated so as to be associated with each other.

The administration information related to the contents information is composed of at least contents addition information, image read addition information, related identification information, and security information. The contents addition information refers to a creator of contents information, used software, a created date and time, created computer information, and the like. The image read addition information is an image read date and time, information on an image reader device that has read out an image, an image read range, an image read option, the name of an image reader device, a driver version, a property, and the like. The related identification information is an ID No. of an RF-ID tag attached to display media on which the same contents information is printed, an ID No. of an RF-ID tag attached to display media on which corrected contents information on the same contents information is printed, and the like. The security information is access permission information to contents, i.e., information on the possibility of browsing, alteration, printing, and the like.

The data administration unit 112 performs: data accumulation control processing such as new registration, additional registration, correction registration, and the like of data accumulated in the data storage unit 111; data communication control via the network 101; update of a database of identification information on an RF-ID tag that is permitted to be used, and the like.

Figure 2:
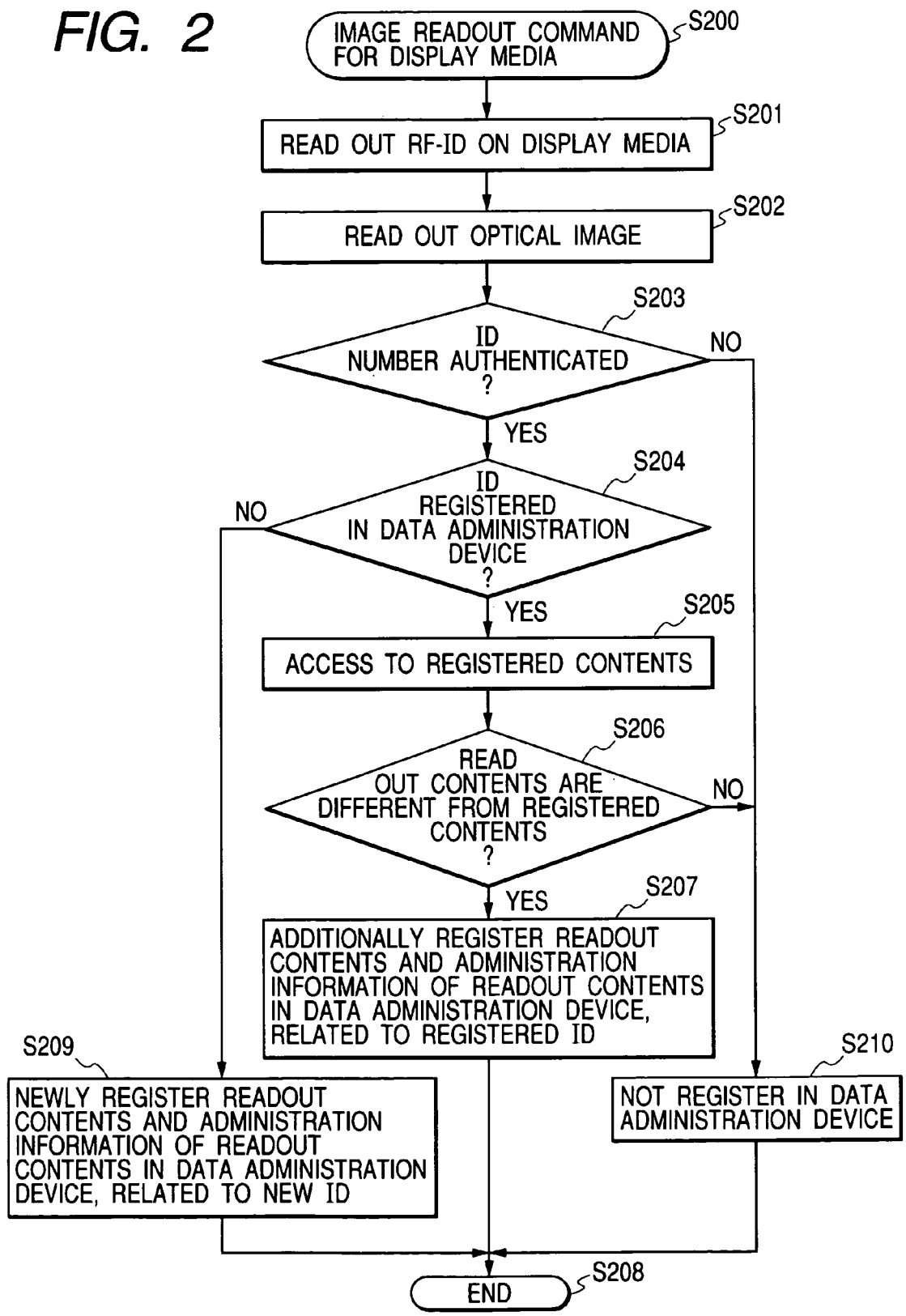
FIG. 2 is a flow chart of an image read process in the contents sharing system using display media with an RF-ID tag according to the first embodiment of the present invention.

FIG. 2 is a flow chart showing a printing process in the contents sharing system using display media with an RF-ID tag according to this embodiment. FIG. 3 is a view showing processing steps in-each device corresponding to the flowchart.

Hereinafter, the printing process will be described with reference to FIGS. 2 and 3.

(1) Read of Identification Information and Confirmation of Permission

The case where the optical image reader device 102 including an RF-ID reader sends an image read instruction of contents drawn on the display media with an RF-ID tag 100 (Step S200 in FIG. 2, and Step S301 in FIG. 3) will be described. First, it is confirmed whether or not an RF-ID tag attached to the display media with an RF-ID tag 100 from which an image is to be read out is permitted to be used. The optical image reader device 102 including an RF-ID reader electrically reads out RF-ID information by communicating with an RF-ID of the display media with an RF-ID tag 100 in a wireless manner, and obtains identification information (Step S201 in FIG. 2, and Steps S302 and S303 in FIG. 3). The readout identification information (e.g., an ID No.) is sent to the data administration device 103 from the optical image reader device 102 including an RF-ID reader, and is compared with the permitted identification information previously stored (Step S203 in FIG. 2 and Step S306 in FIG. 3). In the case where the display media with an RF-ID tag 100 has permitted identification information, the step proceeds to the subsequent process (Step S204 in FIG. 2 and Step S307 in FIG. 3). In the case where the identification information is not permitted, or an RF-ID does not respond, registration is not performed in the data administration device 103 (Step S210 in FIG. 2 and (1) of Step S310 in FIG. 3), and the steps are completed.

(2) Read of Contents

Figure 3:
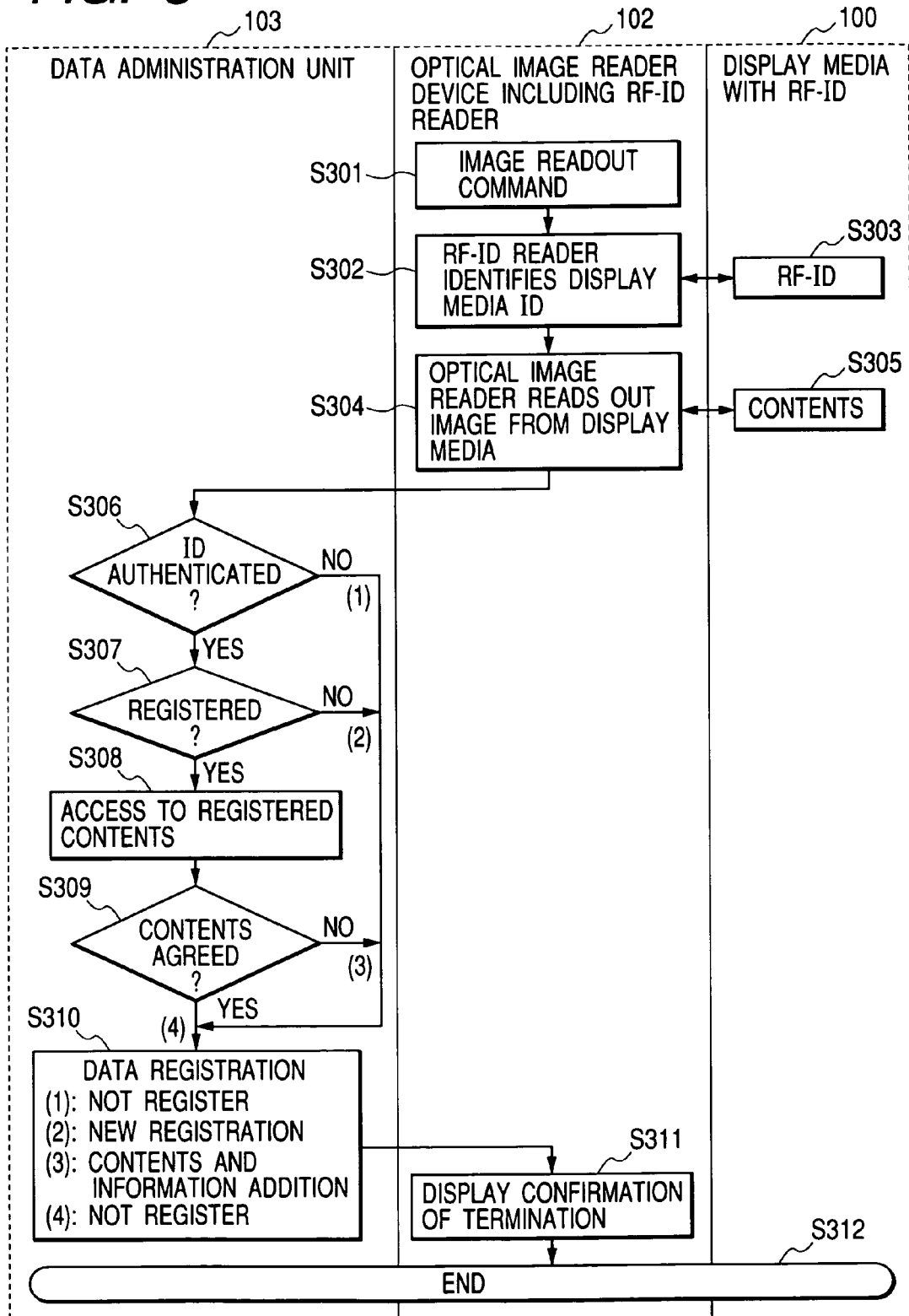
FIG. 3 is a flow chart of an image read process of each device in the contents sharing system using display media with an RF-ID tag according to the first embodiment of the present invention.

At the same time of obtaining identification information or before/after obtaining identification information, the image reader device optically reads out an image of contents drawn on the display media with an RF-ID tag 100 (Step S202 in FIG. 2 and Steps S304 and S305 in FIG. 3). The read of contents depends upon the resolution, brightness, contrast, color temperature, and the like of the reader device.

(3) Registration Confirmation and Processing of Contents

In the case where the readout identification information is permitted to be used, it is confirmed whether or not the identification information has already been registered with the contents in the data administration device 103 (Steps S203 and S204 in FIG. 2, and Steps S306 and S307 in FIG. 3). In the case where the contents information regarding the identification information and the administration information related to the contents are not registered in the data administration device 103, the contents from which an image is instructed to be read out are newly registered in the data administration device 103 (Step S209 in FIG. 2, and (2) of Step S310 in FIG. 3). A data group at this time consists of an ID No. that is identification information, readout contents information, and administration information related to the contents.

Furthermore, in the case where the contents are registered in the data administration device 103, the registered contents are accessed (Step S205 in FIG. 2 and Step S308 in FIG. 3), and it is checked whether or not the contents from which an image has been read out are the same as the registered contents (Step S206 in FIG. 2 and Step S309 in FIG. 3). The contents information is compared as follows. Comparison and inference regarding an image are performed, and it is determined whether or not the contents information is the same in terms of a probability by software. Then, in the case where the contents from which an image has been read out are not the same as the registered contents, the readout contents are additionally registered as a part of the data group (Step S207 in FIG. 2 and (3) of Step S310 in FIG. 3). Furthermore, in the case where the contents from which an image has been read out are the same as the registered contents, the registered contents in the data administration device 103 are not changed and the like (Step S210 in FIG. 2 and (4) of Step S310 in FIG. 3).

After completion of the processing in Step S310 in FIG. 3, the optical image reader device 102 including an RF-ID reader displays the confirmation of completion of processing (Step S311 in FIG. 3). After that, the processing operation is completed (Step S208 in FIG. 2 and Step S312 in FIG. 3).

In this embodiment, when an instruction of reading an image from the contents is provided, an RF-ID tag attached to the display media with an RF-ID tag 100 to be printed first is identified. After the permission is confirmed, registration confirmation in the data administration device 103 is performed. Then, it is confirmed whether or not the contents from which an image is instructed to be read out are registered in the data administration device 103. However, those two confirmation processes may be performed at the same time or in an opposite order. Furthermore, processing may be completed with either one of the read. For example, it is also possible to use the image reader device of the present invention so as to be operated as the conventional image reader device. Furthermore, it is possible to use the image reader device of the present invention so that contents information that has already been registered by reading only RF-ID information can be accessed.

Using the contents sharing system according to this embodiment, the information on the display media with a printed RF-ID tag 100 is accumulated in the data administration device 103 on the network 101.

In this embodiment, the following can be realized.

The contents drawn on display media (paper) without an RF-ID tag can be registered in the contents sharing system on the network 101 by attaching an RF-ID tag to display media (paper) (desirably, a reverse surface).

The contents inputted by handwriting on display media (paper) with an RF-ID tag on a reverse surface can be registered in the contents sharing system.

The information added by handwriting to the contents printed on display media (paper) with an RF-ID tag can be registered in the contents sharing system.

Thus, the contents drawn on display media (paper) that are not registered on the network 101 can be introduced onto the network 101, and display media (paper) information can also be administered.

By attaching an RF-ID tag to display media, when contents drawn on the display media are read out, the contents are compared with an ID No. that is its identification information, whereby the ID No., the contents information, and administration information related to the contents information can be administered in the data administration device 103 connected to the network 101. Consequently, the display media (paper) information contents can be shared on the network 101 under the administration with excellent security.

Second Embodiment

Next, a second embodiment of the present invention will be described with reference to FIGS. 4 to 6.

FIG. 4 is a block diagram showing a configuration of a contents sharing system using display media with an RF-ID tag according to the second embodiment of the present invention. In FIG. 4, the same components as those in the first embodiment shown in FIG. 1 are denoted with the same reference numerals as those therein.

FIG. 4 is different from FIG. 1 in the configuration of the optical image reader device 102 including an RF-ID reader. More specifically, the optical image reader device 102 including an RF-ID reader in the contents sharing system according to this embodiment has a printing function, and adopts a configuration similar to that obtained by embedding an RF-ID reader function is contained in a conventional digital copier.

The optical image reader device 102 including an RF-ID reader includes a network/interface (I/F) 104, a control unit 105, two RF-ID read units 106a, 106b, an image read unit 107, a memory unit 108, a manipulation unit 109, and a print unit 401.

The display media with an RF-ID tag and the optical image reader device 102 including an RF-ID reader perform wireless communication between the RF-ID read unit 106a and an RF-ID1 tag on display media 100a with an RF-ID1 tag from which an image is read out, and associate readout contents. The display media with an RF-ID tag and the optical image reader device 102 including an RF-ID reader perform wireless communication between the RF-ID read unit 106b and an RF-ID2 tag on display media 102b with an RF-ID2 tag on which an image is printed, and associate write contents.

Figure 5B:
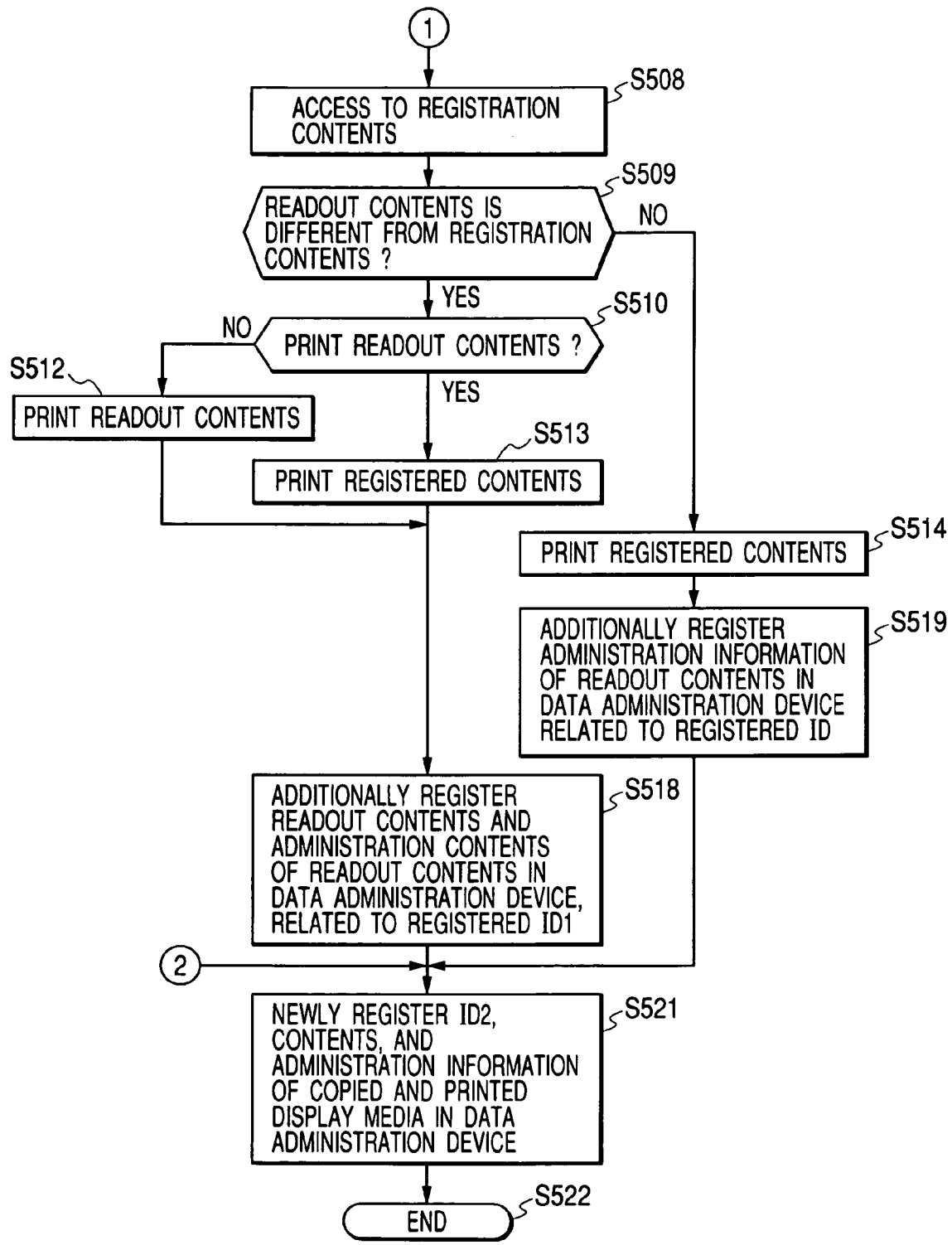
FIG. 5 is comprised of FIGS. 5A and 5B showing flow charts of an image read process in the contents sharing system using display media with an RF-ID tag according to the second embodiment of the present invention.
Figure 6B:
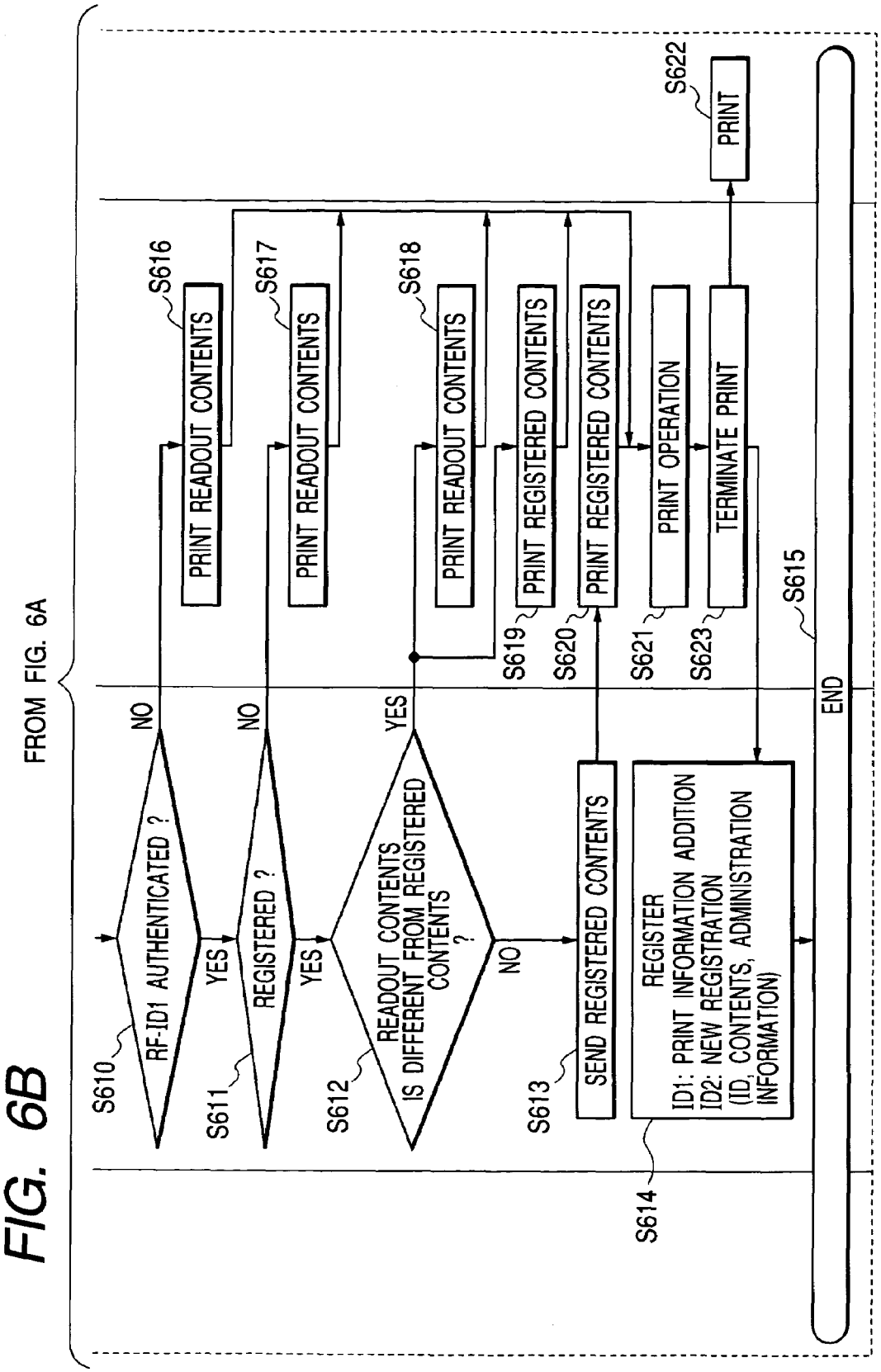
FIG. 6 is comprised of FIGS. 6A and 6B showing flow charts of an image read process of each device in the contents sharing system using display media with an RF-ID tag according to the second embodiment of the present invention.

FIGS. 5A and 5B are flowcharts showing image read and printing processes in the contents sharing system using display media with an RF-ID tag according to the second embodiment of the present invention, and FIGS. 6A and 6B show processing steps in each device corresponding to the flowchart.

Hereinafter, the image read and printing process will be described with reference to FIGS. 5A and 5B through 6A and 6B.

The case where contents drawn on the display media with an RF-ID1 tag 100a that has already been registered are copied on another display media with an RF-ID2 tag 100b will be described.

(1) Read of RF-ID2 and Confirmation of Use Permission

The optical image reader device 102 including an RF-ID reader instructs copying of contents drawn on the display media including an RF-ID1 tag 100a on the display media with an RF-ID2 tag 100b (Step S501 in FIGS. 5A and 5B, and Step S601 in FIGS. 6A and 6B) In order to confirm use permission of the RF-ID2 tag attached to the display media including an RF-ID2 tag of copy destination, the optical image reader device 102 including an RF-ID reader reads out the RF-ID2 (Step S502 in FIGS. 5A and 5B, Steps S602 and S624 in FIGS. 6A and 6B), sends the RF-ID2 to the data administration device 103, and confirms whether or not the identification information.(e.g., an ID No.) on copy destination (Step S503 in FIGS. 5A and 5B and Step S603 in FIGS. 6A and 6B) is permitted. In the case where the RF-ID2 is not permitted to be used, the optical image reader device 102 including an RF-ID reader does not perform printing (Step S516 in FIGS. 5A and 5B, and Step S604 in FIGS. 6A and 6B). Furthermore, in the case where the RF-ID2 is permitted to be used, the process proceeds to the stage of drawing on the display media 100b.

(2) Read of RF-ID1 and Use Permission

The optical image reader device 102 including an RF-ID reader reads out the RF-ID1 attached to the display media with an RF-ID1 tag 100a of copy source with an electromagnetic wave (Step S504 in FIGS. 5A and 5B, and Steps S605 and S606 in FIGS. 6A and 6B). Furthermore, the optical image reader device 102 including an RF-ID reader reads out the contents drawn on the display media with an RF-ID1 tag of copy source in the optical image read unit 107 (Step S505 in FIGS. 5A and 5B, and Steps S607 and S608 in FIGS. 6A and 6B).

(2-1) The Case where the RF-ID1 is not Permitted to be Used

The data administration device 103 confirms whether or not an ID1 No. of the display media with an RF-ID1 tag 100*a* of copy source is permitted to be used (Step S506 in FIGS. 5A and 5B, and Steps S609 and S610 in FIGS. 6A and 6B). In the case where the RF-ID1 is not attached (in the case where the ID1 No. is not permitted to be used), conventional copying processing, i.e., processing of printing optically read out contents is performed (Step S515 in FIGS. 5A and 5B, and Steps S616, 621, and 622 in FIGS. 6A and 6B). The copy destination in this case can be administered in the present system in a similar manner to that described later, in the case where the RF-ID2 is attached. In the case where the RF-ID2 is not attached, the copy destination is the same as that in the conventional copying processing. Even in the case where the RF-ID1 is attached, but is not permitted to be used, similarly, the conventional copying processing, i.e., the processing of printing optically readout contents is performed (Step S515 in FIGS. 5A and 5B, and Steps 616, 621, and 622 in FIGS. 6A and 6B).

(2-2) The Case where the RF-ID1 is Permitted to be Used, but is not Registered

In the case where the RF-ID1 is attached to the display media 100*a* of copy source, but an ID1 No. is not registered, the readout contents are not administered as a data group in the data administration device 103, so that the contents are newly registered (Step S520 in FIGS. 5A and 5B, and Step S614 in FIGS. 6A and 6B). In the new registration, the readout contents are associated with a new ID1 No., and the readout contents and administration information related to the contents are accumulated as a data group in the data administration device. Then, the readout contents are drawn on the display media with an RF-ID2 tag 10*b*, and are also newly registered with respect to the RF-ID2 of the display media with an RF-ID2 tag 100*b* on which the readout contents are printed by copying (Step S521 in FIGS. 5A and 5B, and Step S614 in FIGS. 6A and 6B).

Furthermore, in the case where the ID1 No. of the display media with an RF-ID1 tag of copy source is permitted to be used, it is further checked whether or not the ID1 No. is registered in the data administration device 103 (Step S507 in FIGS. 5A and 5B, and Step S611 in FIGS. 6A and 6B).

In the case where the ID1 No. is not registered, data regarding the ID1 is new in the present system. Therefore, the readout contents are printed on the display media with an RF-ID2 tag 100*b* (Step S511 in FIGS. 5A and 5B, and Step S617 in FIGS. 6A and 6B), newly registered in the data administration device 103 with respect to new ID1 (Step S517 in FIGS. 5A and 5B, and Step S614 in FIGS. 6A and 6B), and also newly registered with respect to new ID2 (Step S521 in FIGS. 5A and 5B, and Step S614 in FIGS. 6A and 6B).

(2-3) The Case where the RF-ID1 is Permitted to be Used, and the same Contents are Registered In the case where the ID1 No. is registered in the data administration device 103, the registered contents are compared with the readout contents for checking the difference therebetween (Steps S508 and S509 in FIGS. 5A and 5B, and Step S612 in FIGS. 6A and 6B). In the case where the registered contents are the same as the readout contents, the contents of copy source are not changed from the registered contents. Therefore, the registered contents are printed on the display media with an RF-ID2 tag 100*b* (Step S514 in FIGS. 5A and 5B, and Steps S613 and S620 in FIGS. 6A and 6B). As a result, factors for degrading image quality such as noise caused in optical read can be removed, and copying of high quality can be realized. Regarding the change with respect to the administration data, the change is associated with the registered ID1 and additionally registered in the contents administration information (Step S519 in FIGS. 5A and 5B, and Step S614 in FIGS. 6A and 6B).

(2-4) The Case where the RF-ID1 is Permitted to be Used, but Different Contents are Registered In the case where the readout contents are different from the registered contents, there are two or more kinds of contents that can be printed (Steps S510, S512, and S513 in FIGS. 5A and 5B, and Steps S618 and S619 in FIGS. 6A and 6B). The two or more kinds of contents refer to the following. The number of registered contents in the case where the contents have already been registered is 1 or more. Therefore, when the readout contents are added for selection, there are two or more kinds of contents that can be printed. This selection is shown in a display unit of the manipulation unit 109 of the optical image reader device 102 including an RF-ID reader, and a user can determine the contents by designating the contents in an input unit of the manipulation unit 109.

(3) Printing of Contents

In the case of printing readout contents (Step S512 in FIGS. 5A and 5B, and Step S618 in FIGS. 6A and 6B), the readout contents are associated with registered ID1 . Then, the readout contents, and the fact that the readout contents are printed, the fact serving as administration information related to the readout contents, are additionally registered in the data administration device 103 (Step S518 in FIGS. 5A and 5B, and Step S614 in FIGS. 6A and 6B).

Furthermore, in the case of printing registered contents (Step S513 in FIGS. 5A and 5B, and Step S619 in FIGS. 6A and 6B), the registered contents are similarly associated with the registered ID1. Then, the readout contents, and the fact that the registered contents are printed, the fact serving as administration information related to the registered contents, are additionally registered in the data administration device 103 (Step S518 in FIGS. 5A and 5B, and Step S614 in FIGS. 6A and 6B).

(4) Accumulation of a Data Group in the Data Administration Device

On completion of printing (Step S623 in FIGS. 6A and 6B), printing contents and administration information related to the contents are newly registered in the data administration device 103 with the contents and the information associated with an ID2 No. of an RF-ID2 tag attached to the printed display media including an RF-ID2 tag 100*b* (Step S521 in FIGS. 5A and 5B, and Step S614 in FIGS. 6A and 6B), whereby a copying process is completed (Step S522 in FIGS. 5A and 5B, and Step S615 in FIGS. 6A and 6B).

According to this embodiment, by placing the display media with an RF-ID1 tag 100*a* on which contents are drawn in the optical image reader device 102 including an RF-ID reader having a printing function, the following can be realized.

Contents drawn on the display media with an RF-ID1 tag 100*a* can be copied on the display media with an RF-ID2 tag 10*b*.

In the case where contents are not registered in the present system, the contents can be newly registered.

In the case where the contents drawn on the display media with an RF-ID1 tag 100*a* are changed from the registered contents, desired contents can be selected for printing.

In the case of printing the registered contents, they can be copied without degrading the image quality during optical read.

According to this embodiment, an ID1 No. of display media of copy source is associated with an ID2 NO. of display media of copy destination. Therefore, contents can be changed and the fact that the contents are printed can be administered. Thus, a contents sharing system can be realized, which is easily accessible by a user and administered at a high degree.

Third Embodiment

Next, a third embodiment of the present invention will be described with reference to FIG. 7.

FIG. 7 is a block diagram showing a configuration of a contents sharing system using display media with an RF-ID tag according to the third embodiment of the present invention. In FIG. 7, the same components as those in the first embodiment shown in FIG. 1 are denoted with the same reference numerals as those therein.

In this embodiment, an optical image reader device 102 including an RF-ID reader, a print device including an RF-ID reader 700, and a plurality of data administration devices 103a, 103b are connected to a network 101, and they are connected at different IP addresses. Herein, assumed as the print device including an RF-ID reader 700 is the image reader device including an RF-ID reader 102 described in the second embodiment without the image read unit 107.

The contents in this embodiment are accumulated in the data administration devices 103a, 103b as a data group consisting of identification information, contents information, and administration information related to the contents. This embodiment can be realized by adding information regarding at which IP address the data group is accumulated when the data group is accumulated in the data storage unit 111, and by allowing the data administration devices 103a, 103b to sometimes share a data table composed of ID Nos. and IP addresses that are identification information, and to update it.

This is similar to what is performed by a DNS server in the Internet. This function is owned by the data administration devices 103a, 103b. However, an administration device may be set separately in accordance with the scale of the network 101.

According to the present invention, the data group consisting of identification information, contents information, and administration information related to the contents is generally accumulated based on the order of the data administration devices 103a, 103b optimized as a whole in accordance with an organization form, a setting place, and other factors.

According to the contents sharing system of this embodiment, by using the optical image reader device 102a including an RF-ID reader connected to the Internet 101 and connected to any place, the contents sharing system can be used.

Fourth Embodiment

Next, a fourth embodiment of the present invention will be described.

An optical image reader device including an RF-ID reader in the contents sharing system according to this embodiment has a function of writing identification information to an RF-ID tag attached to display media with an RF-ID tag with an electromagnetic wave. Because of this, display media with an RF-ID tag having a write function or a rewrite function with respect to an IC chip can be used, and a contents sharing system with high security can be realized.

For example, in the case where contents on display media with an RF-ID tag of an IC chip in which identification information is not written partially or entirely are read out as an image and registered in the system, it is possible to encode the identification information. That is, an ID (identifier) that is an index of contents on the network can be protected. Alternatively, in the case where identification information is not written partially or entirely, its region can be used for authentication.

This can specify an individual that can access. Furthermore, identification information can be set by a user, and therefore the convenience of a contents sharing system is enhanced.

In the above, various examples and embodiments of the present invention have been described. It would be appreciated by those skilled in the art that the spirit and scope of the present invention are not limited to the particular description in the specification and the drawings, and can be altered and modified variously without departing from the range of the claims.

Exemplary embodiment modes of the present invention will be described below.

Embodiment Mode 1

A system including: an image reader device having a contents information read function of reading out contents information drawn on display media with an RF-ID tag and an identification information read function of reading out identification information on the RF-ID tag by wireless communication; and a data administration device for accumulating the contents information read out by the contents information read function and administration information related to the contents information so that they are associated with the identification information.

According to Embodiment Mode 1, it is possible for a user to easily access contents information, and to use and administer display media (e.g., paper) information and electronic information on contents in a seamless manner.

Embodiment Mode 2

The system according to Embodiment Mode 1, including control means for controlling, in a case where the identification information read out by the image reader device, contents information related thereto, and administration information are not accumulated in the data administration device, in such a manner that the contents information is newly accumulated in the data administration device together with the administration information related to the contents information so as to be associated to the identification information.

According to Embodiment Mode 2, in the case of newly registering contents that are not registered in a contents sharing system in the system, the contents can be registered by attaching or forming an RF-ID tag to display media on which the contents are displayed and by reading out identification information and contents information by an image reader device. Alternatively, the contents can also be registered even by handwriting or drawing contents information on display media with an RF-ID tag that is not registered, or by drawing the contents information by printing or the like by a printing device not corresponding to the system, thereby reading out identification information and contents information by the image reader device.

According to Embodiment Mode 2, a user using the system can register contents created by the user in the system, and can freely use a contents sharing system administered with security.

Embodiment Mode 3

The system according to Embodiment Mode 1, characterized in that the control means controls, in a case where ID information read out by the image reader device is accumulated in the data administration device, and the contents information related to the ID information is different from contents information accumulated in the data administration device, in such a manner that the contents information is accumulated in the data administration device together with the administration information related to the contents information so as to be associated with the ID information.

According to Embodiment Mode 3, a contents history such as correction, modification, addition, and the like can be administered even after contents are registered. That is, even when contents are changed, all the contents can be accessed, and a changed portion can be grasped. Therefore, desired contents can be used for printing, processing, and the like.

Embodiment Mode 4

The system according to Embodiment Mode 1, including a plurality of the data administration devices and the image reader devices, in which at least a data group composed of all the contents information, administration information related to the contents information, and the ID information accumulated in each of the data administration devices can be shared, and the ID information read out from the respective image reader devices and the contents information related thereto can be accumulated in a desired one of the data administration devices.

According to Embodiment Mode 4, even in the case where the scale of the system is enlarged, i.e., in the case where a plurality of data administration devices and a plurality of image reader devices are connected to the network, the system can be realized. More specifically, for example, the system can be realized by allowing a data administration device to have a function of sharing identification information (e.g., an ID No. and an IP address of a data administration device in which the contents information is accumulated) at any time so that IP addresses are shared by DNS servers on the Internet, or by separately setting a server for administering an ID No. and an IP address of a data administration device of contents information, such as a DNS server.

Furthermore, according to Embodiment Mode 4, even at any place in the world connected to the Internet, as long as the image reader device of this embodiment mode is connected, contents can be shared with high security.

Embodiment Mode 5

An image reader device having a function of reading contents information drawn on display media having an RF-ID tag, including: identification information read means for reading out identification information on the RF-ID tag by wireless communication; contents information read means for reading out the contents information; and transmission means for transmitting the identification information read out by the identification information read means, the contents information read out by the contents information read means, and administration information related thereto to a data administration device.

According to Embodiment Mode 5, it is possible to use display media with an RF-ID tag that is permitted to be used. Furthermore, it is possible to administer contents information drawn on display media with an RF-ID tag so that the contents information is associated with identification information, whereby contents on display media with an RF-ID tag can be introduced into the network, and the contents can be shared.

Furthermore, according to Embodiment Mode 5, even in the case where contents have already been drawn on display media without an RF-ID tag, by attaching or forming an RF-ID tag to display media when introducing the display media into the system of Embodiment Mode 5, and using the image reader device of Embodiment Mode 5, contents can be introduced into the network and administered.

Embodiment Mode 6

The image reader device according to Embodiment Mode 5, including printing means for printing contents information on the display media.

Embodiment Mode 6 is effective, for example, in the case where contents are drawn on display media with an RF-ID tag, and it is desired to copy the contents. Due to the image reader device of Embodiment Mode 6, an image can be read out and compared with the contents that have already been registered, and in the case where the contents are different, desired contents can be printed on display media with an RF-ID tag. This enables the contents to be copied easily, and even in the case where addition, correction, and the like are performed, original contents before correction can also be printed.

Furthermore, according to Embodiment Mode 6, it is possible to extract a change of contents drawn on display media.

Embodiment Mode 7

The image reader device according to Embodiment Mode 5, including identification information write means for writing identification information to an RF-ID tag attached to the display media with an electromagnetic wave.

According to Embodiment Mode 7, display media with an RF-ID tag having a write function unit or a rewrite function unit with respect to an IC chip can also be used, and a system with higher security can be realized. More specifically, data that accumulate an RF-ID tag can use a write memory region for encoding or authentification, in addition to identification information.

The system of the present invention is adapted for administration of personal documents, important documents with high confidentiality with respect to a plurality of persons, and the like. In particular, the system of the present invention is suitable for administration of confidential documents in an office.

Furthermore, the system of the present invention is also effective for the purpose of preventing unauthorized printing, copying, tampering, etc., and is suitable for negotiable securities, official documents, contracts, application forms, certificates, patient charts, receipts, admission tickets, works (novels, paintings, posters, post cards), membership cards, electronic document outputs for the government, photographs, etc.

The identification information write function unit of writing identification information to an RF-ID tag may be the same as a function unit of reading out identification information, integrated therewith, or configured separately therefrom. However, it is desirable that they are the same.

As described above, according to the system of the present invention, readout contents can be administered so as to be associated with media on which the contents are drawn. Therefore, if administration information thereof enables a user to easily access contents information, and to use and administer display media (e.g., paper) information and electronic information on contents in a seamless manner.

Furthermore, according to the image reader device of the present invention, the above-mentioned system can be realized, and therefore high security can be realized.

What is claimed is:

1. A system for administering contents, comprising:
readout means for reading out contents information drawn on first display media;
detection means for detecting identification information on the first display media; and
administration means for administering the contents information read out by read means and the identification information detected by the detection means in association with each other,
wherein, in a case where the contents information read out by the read means are not registered on a network, the administration means administers the identification information detected by the detection means and the contents information read out by the read means in association with each other.

2. A system for administering contents, comprising:
readout means for reading out contents information drawn on first display media;
detection means for detecting identification information on the first display media; and
administration mean for administering the contents information read out by read means and the identification information detected by the detection means in association with each other,
wherein, in a case where the contents information read out by the read means is not matched with contents information registered in association with the identification information detected by the detection means, the administration means administers the contents information read out by the read means in association with the identification information detected by the detection means, in addition to contents information that has already been registered.

3. A system for administering contents, comprising:
readout means for reading out contents information drawn on first display media;
detection means for detecting identification information on the first display media; and
administration means for administering the contents information read out by read means and the identification information detected by the detections means in association with each other,
wherein, in a case where the contents information read out by the read means is matched with contents information registered in association with the identification information detected by the detection means, the administration means does not newly register contents information.

4. A system for administering contents, comprising:
readout means for reading out contents information drawn on first display media;
detection means for detecting identification information on the first display media; and
administration means for administering the contents information read out by read means and the identification information detected by the detection means in association with each other,
wherein the detection means also detects identification information on second display media on which the contents information read out by the read means are printed, the system for administering contents further comprising printing means for printing the contents information read out by the read means on the second display media in accordance with the identification information on the second display media, and
wherein the printing means prints the contents information read out by the read means on the second display media in accordance with a registration state on a network of the contents information read out by the read means.

5. A system for administering contents, comprising:
readout means for reading out contents information drawn on first display media;
detection means for detecting identification information on the first display media; and
administration means for administering the contents information read out by read means and the identification information detected by the detection means in association with each other,
wherein the detection means also detects identification information on second display media on which the contents information read out by the read means are printed, the system for administering contents further comprising printing means for printing the contents information read out by the read means on the second display media in accordance with the identification information on the second display media, and
wherein, in a case where the contents information read out by the read means is not matched with contents information registered in association with the identification information on the first display media detected by the detection means, the printing means selectively prints one of the contents information read out by the read means and the contents information that has already been registered.

* * * * *